United States Patent [19]

Edlund et al.

[11] Patent Number: 5,388,615

[45] Date of Patent: Feb. 14, 1995

[54] SEALING MEANS AND SEALING VALVE FOR CONTAINER OPENINGS

[75] Inventors: Roy Edlund, Leinfelden-Echterdingen; Gerd Schollenberger, Sersheim, both of Germany

[73] Assignee: Busak & Luyken GmbH & Co., Stuttgart, Germany

[21] Appl. No.: 163,835

[22] Filed: Dec. 7, 1993

[30] Foreign Application Priority Data

Dec. 11, 1992 [DE] Germany .................... 4241943

[51] Int. Cl.$^6$ ............................................. F16K 15/14
[52] U.S. Cl. ................................... 137/859; 220/209
[58] Field of Search .................. 220/209; 137/843, 854, 137/859

[56] References Cited

U.S. PATENT DOCUMENTS

| | | |
|---|---|---|
| 2,941,541 | 6/1960 | Peras . |
| 3,270,771 | 9/1966 | Morgan ................. 137/859 |
| 3,537,903 | 11/1970 | Braun ................... 137/843 X |
| 4,244,378 | 1/1981 | Brignola ............... 137/843 X |
| 4,493,339 | 1/1985 | Porter .................. 137/859 X |

FOREIGN PATENT DOCUMENTS

| | | |
|---|---|---|
| 1142080 | 11/1958 | France ................. 137/843 |
| 1119351 | 12/1961 | Germany . |
| 3307835 | 9/1984 | Germany . |
| 8534913 | 3/1986 | Germany . |
| 4135711 | 12/1992 | Germany . |
| 590860 | 7/1947 | United Kingdom . |
| 2156574 | 10/1985 | United Kingdom . |
| 2158634 | 11/1985 | United Kingdom . |

OTHER PUBLICATIONS

Patent abstracts of Japan, vol. 13 No. 92 (E-722)(3440) Mar. 3, 1989 Research Disclosure Nr. 255 (1985) Jul., Emsworth, Hampshire, GB, p. 362.

*Primary Examiner*—Robert G. Nilson
*Attorney, Agent, or Firm*—Flynn, Thiel, Boutell & Tanis

[57] ABSTRACT

A sealing means and sealing valve 10 for container openings is formed from a housing 11, 12 in which a seal 13 is arranged. The seal 13 closes a gap between the housing portions 11, 12. The housing portions 11, 12 exhibit bores 14, 14' and 15 through which a fluid can flow through the housing portions 11, 12, as long as the seal 13 opens up a gap. The seal 13 exhibits a sealing bead 20, which lies across from the spring-bead 22, 23, 24.

5 Claims, 1 Drawing Sheet

SEALING MEANS AND SEALING VALVE FOR CONTAINER OPENINGS

BACKGROUND OF THE INVENTION

The invention concerns a sealing means and sealing valve for container openings consisting of a housing with a gas release connector, in which a sealing element is arranged the element exhibiting a circumferential sealing bead which seats, in an unpressurized state, on a sealing surface and in a pressurized state is separated from the sealing surface.

An element of this kind has become known through the German utility model G 85 34 913.5.

Storage batteries, for example require a gas-release valve which safely prevents the escape of battery acid and $H_2$ gas under normal pressure conditions and, at a predefined overpressure within the battery cell, opens to facilitate a gas-release. It is simultaneously necessary to guarantee that no fluid ,e.g., air unintentionally flows from the outside into the cells of the storage battery. Storage batteries, in particular lead batteries for motorized vehicles, are articles of mass-production and these gas-release valves and sealing means must therefore be produced in as economical a fashion as possible.

The known sealing means according to G 85 34 913.5 exhibits, as sealing means, a disc-shaped seal with a conical seal projection. The disc-shaped seal is connected with a spring which, for its part, is supported in the housing. The spring presses the conical seal projection of the seal against a valve seating. In the event of over pressure inside a container which is to be sealed, the seal is lifted against the force of the spring so that the fluid can escape. In this known sealing means the positioning of the seal is effected largely by means of the conical seal projection and the valve seating. This has the consequence that when the sealing means is opened the positioning is lifted-off. The seal is then guided in a sideward fashion only by means of the spring and the inner wall of a housing. The known sealing means is subjected to pressure only in the vicinity of the opening pressure at the valve seating.

A further sealing valve according to German patent publication P 41 35 711.6 exhibits a lid portion upon which a wall portion is formed. On the wall portion a ring-bead is provided for which runs circumferentially around the cylinder-shaped stopper. The sealing bead facilitates a compensation of tolerance fluctuations in the inner diameter of the wall portion occuring during mass-production of the sealing valve and assures that the sealing bead always seats, in a sealing fashion, on the outer wall of the gas-release connector. The known sealing valve seats only in a linear fashion on the wall of the gas-release connector and in this manner undesireable adhesive forces between the inner side of the wall portion and the outer wall of the gas-release connector are prevented.

It is the underlying purpose of the invention to further improve a valve of the known kind and to provide for a sensitive pressure response for the valve which can be adjusted to the smallest pressure fluctuation in vessels which are to be sealed.

SUMMARY OF THE INVENTION

This purpose is accomplished in that the sealing element is configured as a rubber-elastic seal exhibiting means for positioning, in that the sealing bead is configured, on a first pressurized side of the seal, as at least one sealing edge, in that the seal on a second side exhibits spring means which are integral with the seal and which act on the sealing bead, the spring means forming spring-beads made from the material of the seal and in that the spring-beads are supportable on a wall of the housing.

In this fashion, the inventive sealing means and sealing valve has the advantage that, in the event of the occurence of an intolerable pressure in the container it is necessary to overcome the force of the spring means of the inventive seal so that a gap is opened in the housing through which the pressurized fluid can stream-off into the atmosphere. The spring means can be precisely adjusted to the expected pressure increase and the entire element can be manufactured as an integral component. The sealing means and sealing valve must, subsequent to manufacturer, simply be inserted into the gas-release connector of a container subsequent to which this gas-release connector is securely sealed to guarantee that no intolerable pressures occur in the storage battery. The seal itself is arranged in a protected fashion within the housing so that the inventive sealing means and sealing valve is maintenance free and cannot be unintentionally damaged.

A further advantage is that the seal is easy to manufacture and the spring means are fashioned from the same material as the seal itself. The spring means or the spring-bead can already be formed on one side of the seal during manufacture of the seal. The sealing edge is formed on the other side of the seal. The tip of the sealing edge is, in an advantageous fashion, formed from the line of intersection between two conical surfaces. In this fashion one guarantees that the sealing edge seats on a bordering sealing surface in a linear fashion only.

In a preferred configuration the sealing means and sealing valve is provided with a seal in the shape of an apertured disc and an attachment strip is configured on the outer edge of the seal to fix the position of the seal in the housing and an opening is provided for in the vicinity of the middle of the seal at which, at a first side, the surrounding sealing bead borders.

In an outer region the seal is held securely in the housing by means of an attachment strip and in a further region, preferentially in the vicinity of the middle of the disc-shaped seal, an opening is provided for through which, in the event of an opened gap between the housing components, the fluid subject to pressure can stream out of the container.

In a further embodiment the seal is configured in a disc-like fashion in the housing and means for fixing the position of the seal in the housing are provided for in the vicinity of the middle. In the vicinity of the outer edge of the seal the surrounding sealing bead is located on a first side and on the second side one or more rubber-elastic spring-beads are formed.

In contrast to the disc-shaped seal this type of sealing body has the advantage that no opening or openings must be formed on the sealing body itself.

In a further configuration of the invention, the sealing means and sealing valve is configured as a stopper which is comprised from a first housing portion and a second housing portion and the seal is arranged between the first and the second housing portions. In this fashion the seal seals-off a fluid flow path which runs between both housing portions. Bores of differing diameters are provided for in the housing portions to constitute the fluid flow path. The bores are configured in such a fashion that the seal itself can be subjected to fluid pressure over as large a total area as possible. In this fashion the response characteristics of the seal can be precisely predetermined.

The unpressurized state obtains in the inventive sealing means and sealing valve when the seal is subjected to a fluid pressure of up to p=50 mbar. With fluid pressures p >50 mbar the seal is in the pressurized state.

Further advantages result from the description and the accompanying drawing. Similarly the previously mentioned features in accordance with the invention and those which are to be described below can be utilized individually or collectively in arbitrary combination. The embodiments mentioned are not to be considered as exhaustive enumerations, but rather have solely exemplary nature.

The invention is represented in the drawing and is more closely explained in the following examples.

Figure 1:
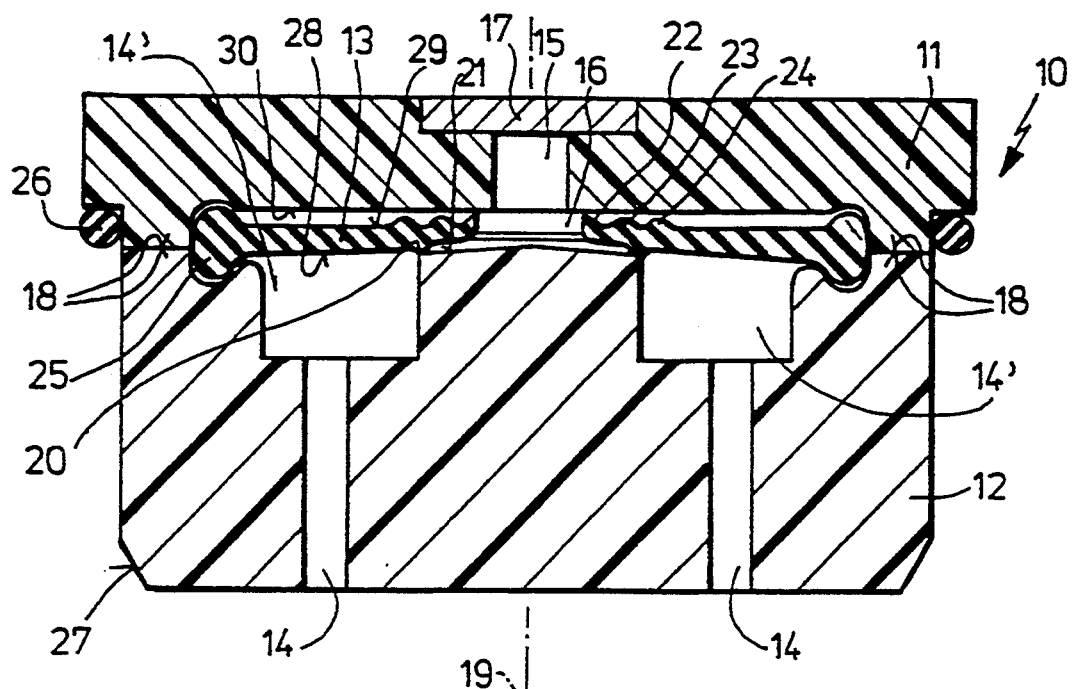
FIG. 1 shows a cross-section through a sealing means and sealing valve in accordance with the invention.

The figures of the drawing show the inventive object in a highly schematic fashion and are not to be taken to scale. The features characterizing objects are so represented in the individual drawings that their construction can be easily shown.

DESCRIPTION OF THE PREFERRED EMBODIMENT

FIG. 1 indicates, with 10, a sealing means and sealing valve which is comprised from a first housing portion 11 and a second housing portion 12. A seal 13, made from rubber-elastic material for example silicone elastomere PU, PVC, TPE (thermoplastic elastomers), or from a fluoroelastomere, for example FPM, is arranged between the first and the second housing portion 11, 12.

The first housing portion 12 exhibits a bore 14 and a bore 14' which are covered by the seal 13 in the figure. The second housing portion 11 exhibits an additional bore 15 which is connected in a fluid flow allowing fashion to the bore 14, 14', to the extent that the seal 13 is not arranged in the housing portions 11, 12 or does not seal-off the passage way. The seal 13 is provided with an opening 16 which is arranged below the bore 15. The bore is closed by a filter 17 in the second housing portion 11, the filter being made from a material which is heat resistant and permeable to gas. The housing portions 11, 12, are for example, welded to mutually bordering side surfaces 18. The sealing means and sealing valve 10 shown in the figure is constructed symmetrically relative to an axis 19.

The seal 13 seals-off a gap formed between the housing portions 11, 12 in that a sealing bead 20 of the seal 13 seats firmly on a sealing surface 21. Spring-beads 22, 23, 24 lie at least partially on the housing portion 11. The outer edge of the seal 13 is configured as an attachment strip 25 which mates with recesses in the housing portion 11, 12.

A rubber-elastic O-ring 26 is also arranged on the sealing means and sealing valve 10 and a pilot bevel 27 is fashioned on the housing portion 12 so that the sealing means and sealing valve 10 can be inserted into a gas-release connector in a simple and secure fashion. Locking means, which are not shown in the figure, can also be provided for on the housing portion 12, so that the sealing means and sealing valve 10 can be securely held in the gas-release connector.

The seal 13 shown in the figure functions in such a fashion that a fluid flowing through the bore 14, 14' flows onto the first side 28 of the seal 13. The spring-beads 22, 23, 24 are formed on a second side 29 of the seal 13 and seat on a housing wall 30 of the housing portion 11. The housing portions 11, 12 can be manufactured from a tough elastic plastic. In FIG. 1, in the pressureless state, only one spring-bead 22 seats on the housing wall 30. It is however also possible for a plurality of spring-beads 22, 23, 24 to already seat on the housing wall 30 in the unpressurized state.

In the unpressurized state, e.g. in the normal operating pressure region between 0 and 50 millibar overpressure, the sealing edge of the sealing bead 20 seats in a sealing fashion on the sealing surface 21. If the fluid pressure in the bore 14, 14' then increases, the fluid acts axially on the seal 13 over a large surface and the sealing bead 20 moves off of the sealing surface 21 to open the gap between the first housing portion 12 and the second housing portion 11. The fluid subjected to increase pressure can stream, via the opening 16 and the bore 15 as well as via the filter 17, out of the gas-release connector.

Figure 2A:
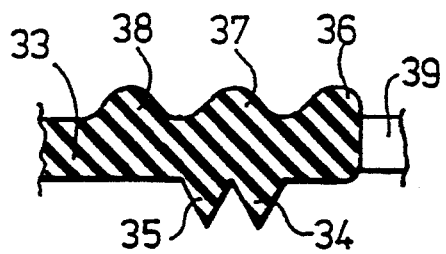
FIG. 2A shows an enlarged section in the vicinity of the sealing edge of a first example of a seal utilized in the inventive sealing means and sealing valve.

FIG. 2a shows a section of a seal 33 in the region of sealing edges 34 and 35. Spring-beads 36, 37, 38 are associated with the sealing edges 34, 35, the sealing beads lying directly across from the sealing edges 34, 35. An opening 39 borders on the sealing edges 34, 35 as well as on the sealing-beads 36, 37, 38 through which, a fluid subjected to pressure can stream when the sealing edges 34, 35 do not seat in a sealing fashion on the sealing surface.

Figure 2B:
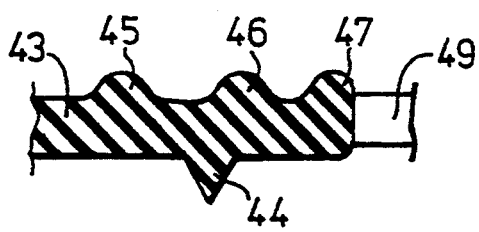
FIG. 2B shows an enlarged section in the vicinity of the sealing edge of a second example of a seal utilized in the inventive sealing means and sealing valve.

FIG. 2b shows a sectional view of a further embodiment of a seal 43 in the vicinity of sealing edge 44. Sealing-beads 45, 46, 47 are assigned to sealing edge 44 whereby a spring-bead is formed at a position which does not lie directly across from the sealing edge 44. FIG. 2b shows a seal in the shape of an apertured disk 43 which exhibits an opening 49.

Figure 2C:
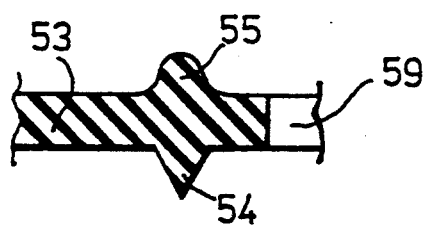
FIG. 2C shows an enlarged section in the vicinity of the sealing edge of a third example of a seal utilized in the inventive sealing means and sealing valve.

FIG. 2c shows a further embodiment of a seal 53 in the vicinity of the sealing edge 54. The sealing edge 54 is arranged directly across from a sealing bead 55 and an opening 59 borders on the sealing edge 54 and the sealing bead 55.

The seal itself can be made from a band which is shaped into an apertured disc and placed between the two housings 11, 12. The seal can, however, also be formed from a disk whereby the attachment means are formed in the vicinity of the middle and the sealing edge and the sealing spring-bead are formed in the outer region.

We claim:

1. Sealing means and sealing valve for a container having an opening, comprising a housing having a gas release connector, a sealing surface, and a seal arranged in the housing, the seal comprising a circumferential sealing bead adapted, in an unpressurized state, to seat on the sealing surface and, in a pressurized state, to be separated from the sealing surface; the seal being made from a rubber-elastic seal material; the sealing bead having, on a first pressurized side of the seal, a sealing edge; the seal having, on a second side, spring means integral with the seal adapted to act on the sealing edge; the spring means having a spring-bead made from the material of the seal, the spring-bead being supported on the wall of the housing opposite to the sealing edge; the seal being configured in the shape of an apertured disk and exhibiting an attachment strip on an outer edge, the attachment strip fixing a position of the seal relative to the housing; the seal being provided with an opening in the vicinity of its middle; the sealing edge bordering on the opening; and further comprising pressure distribution means for distributing a pressure of a fluid located in the container over nearly an entire surface of the seal.

2. The sealing means and sealing valve of claim 1, wherein the sealing means and sealing valve comprises a first housing portion and a second housing portion, the seal being arranged between the first and the second housing portions to seal-off a fluid flow path between the housing portions.

3. Sealing means and sealing valve for a container having an opening, comprising a housing having a gas release connector, a sealing surface, and a seal arranged in the housing, the seal comprising a circumferential sealing bead adapted, in an unpressurized state, to seat on the sealing surface and, in a pressurized state, to be separated from the sealing surface; the seal being made from a rubber-elastic seal material; the sealing bead having, on a first pressurized side of the seal, a sealing edge; the seal having, on a second side, spring means integral with the seal adapted to act on the sealing edge; the spring means comprising at least two spring-beads made from the material of the seal, at least one spring-bead being opposite to the sealing edge, at least one spring-bead being supported on a wall of the housing, and at least one spring-bead being separated from the wall of the housing; and further comprising pressure distribution means for distributing a pressure of a fluid located in the container over nearly an entire surface of the seal.

4. The sealing means and sealing valve of claim 3, wherein the seal is configured in the shape of an apertured disk and exhibits an attachment strip on an outer edge, the attachment strip fixing a position of the seal relative to the housing; the seal being provided with an opening in the vicinity of its middle; and the sealing edge bordering on the opening.

5. The sealing means and sealing valve of claim 3, wherein the sealing means and sealing valve comprises a first housing portion and a second housing portion, the seal being arranged between the first and the second housing portions to seal-off a fluid flow path between the housing portions.

* * * * *